United States Patent [19]

Kato et al.

[11] Patent Number: 4,759,961

[45] Date of Patent: Jul. 26, 1988

[54] COATING METHOD WITH CROSSLINKED COATINGS FROM TWO COAT-ONE BAKE SYSTEMS

[75] Inventors: Tadahiro Kato, Hiratsuka; Yasuhiro Fujii, Kanagawa; Hiroaki Kiyata, Aichi; Masaru Mitsuzi, Zama; Mototaka Iihashi, Hiratsuka, all of Japan

[73] Assignee: Kansai Paint Company, Limited, Amagasaki, Japan

[21] Appl. No.: 48,990

[22] Filed: May 12, 1987

Related U.S. Application Data

[63] Continuation of Ser. No. 816,535, Jan. 6, 1986, abandoned.

[30] Foreign Application Priority Data

Jan. 10, 1985 [JP] Japan .................................. 60-2418
Mar. 13, 1985 [JP] Japan ................................ 60-49889

[51] Int. Cl.$^4$ .............................................. B05D 1/36
[52] U.S. Cl. .............................. 427/407.1; 427/407.2; 427/408; 427/409; 427/412.1; 427/412.3
[58] Field of Search .................... 427/407.1, 409, 408, 427/412.1, 412.3

[56] References Cited

U.S. PATENT DOCUMENTS

| | | | |
|---|---|---|---|
| 3,619,398 | 11/1971 | Bosso et al. ........................... | 204/181 |
| 3,676,383 | 7/1972 | Scala et al. ........................... | 204/181 |
| 3,998,716 | 12/1976 | Masar et al. ........................ | 204/181 |
| 4,315,959 | 2/1982 | Brandts Buys et al. ........ | 427/409 X |
| 4,382,114 | 5/1983 | Höhlein et al. ................. | 427/409 X |
| 4,463,038 | 7/1984 | Takeuchi et al. ................ | 427/407.1 |
| 4,514,445 | 4/1985 | Hokamura et al. ................. | 427/410 |
| 4,529,632 | 7/1985 | Fujii et al. ........................... | 427/409 |
| 4,533,703 | 8/1985 | Kordomenos et al. ............. | 525/440 |
| 4,536,558 | 8/1985 | Kordomenos ....................... | 528/100 |

FOREIGN PATENT DOCUMENTS

49-8694  2/1974  Japan ................................ 204/181.1

*Primary Examiner*—Thurman K. Page
*Attorney, Agent, or Firm*—Armstrong, Nikaido, Marmelstein & Kubovcik

[57] ABSTRACT

In a method for forming coatings, comprising the steps of applying a base coating containing a coloring pigment and/or a metallic pigment to produce a base coat, applying a topcoating containing a hydroxyl group-containing resin and a polyisocyanate compound over the base coat, and curing the coats at a temperature range between room temperature to about 140° C., the method which is characterized in that the base coating contains the following as a vehicle component;

(a) a resin having hydroxyl group and carboxyl group in the molecule, (b) a combination of the resin having hydroxyl group in the molecule and a catalyst for promoting the reaction between the hydroxyl group of the resin and the isocyanate group of the polyisocyanate compound in the topcoating or (c) a combination of the resin having hydroxyl group and carboxyl group in the molecule and a catalyst for promoting the reaction between the hydroxyl group of the resin and the isocyanate group of the polyisocyanate compound in the topcoating.

11 Claims, No Drawings

COATING METHOD WITH CROSSLINKED COATINGS FROM TWO COAT-ONE BAKE SYSTEMS

This application is a continuation of application Ser. No. 816,535 filed 1/6/86, now abandoned.

This invention relates to a method for forming coatings and more particularly to a novel method for forming two coatings to be cured at one time at a temperature of between ambient temperature and about 140° C.

In recent years, plastics such as polypropylene, ABS resins, urethane resins and nylons are increasingly replacing metals to produce outer bodies or components of automotive vehicles, bicycles, household electric appliances and the like. Such outer plastics bodies are generally covered with coating to give an improved appearance. Known coating methods vary according to a particular use of the plastics bodies and include a one-coating-one-baking method in which a solid color coating composition containing a coloring pigment or a metallic coating composition containing a metallic pigment is applied and baked for finish and a two-coatings-one-baking method in which the foregoing composition is applied to a substrate to give a base coat and a clear coating composition is applied over the base coat to produce a topcoat and the coatings are baked at one time. Of these methods, the two-coatings-one-baking method is widely used because it gives a finish coat outstanding in surface smoothness, distinctness-of-image gloss, weathering resistance and the like. However, since plastics bodies tend to deform or to change their properties unlike metallic bodies when heated at high temperatures, the two-coatings-one-baking method can not use coating compositions to be cured at high temperatures, and thus inevitably involves the use of those curable at a temperature range of between room temperature and about 140° C.

Examples of conventional coating compositions useful for forming a base coat over a plastics substrate by the two-coatings-one-baking method include solid color coating compositions and metallic coating compositions comprising a resin having in the molecule one functional group such as hydroxyl group as a vehicle component and a coloring pigment and/or a metallic pigment. Such resins are, for example, chlorinated polypropylene resins, graft copolymers of said resin with acrylates or methacrylates, polymers of acrylates or methacrylates, and nitrocellulose. Chiefly used for forming a topcoat are clear coating compositions such as those containing a hydroxyl group-containing resin and a polyisocyanate compound as vehicle components. These conventional coating compositions all give coats curable at a temperature range of between ambient temperature and 140° C.

Although higher in surface smoothness, distinctness-of-image gloss, weathering resistance and the like, the coats formed from the aforesaid coating compositions by the two-coatings-one-baking method are lower in water resistance and adherence between the base coat and topcoat thus produced and have the drawback of being likely to cause the internal break of coloring or metallic coat due to uneven cohesion (i.e. cohesive failure). These drawbacks are significantly serious problems in view of the use of these coating compositions for giving an improved appearance to the plastics products. Accordingly earliest solution of the problems is desired.

It is the main object of this invention to provide a new two-coatings-one-baking method for forming coats which is capable of giving coatings significantly improved in water resistance, adherence between the base coat and topcoat and resistance to cohesive failure and free from the reduction in surface smoothness, distinctness-of-image gloss and weathering resistance.

This and other objects of the present invention will become more apparent from the following description.

In a method for forming coats comprising the steps of applying to a substrate a base coating composition (hereinafter referred to as "base coating") containing a coloring pigment and/or a metallic pigment, applying a topcoating composition (hereinafter called "topcoating") containing a hydroxyl group-containing resin and a polyisocyanate compound over the base coat, and curing the coats at a temperature range of between ambient temperature and about 140° C., the method of the invention is characterized in that the base coating contains as a vehicle component:

(a) a resin having hydroxyl group and carboxyl group in the molecule, (b) a combination of a resin having hydroxyl group in the molecule and a catalyst for promoting the reaction between the hydroxyl group of the resin and the isocyanate group of the polyisocyanate compound in the the topcoat, or (c) a combination of a resin having hydroxyl group and carboxyl group in the molecule and a catalyst for promoting the reaction between the hydroxyl group of the resin and the isocyanate group of the polyisocyanate compound in the topcoat.

Our research revealed that when the two-coatings-one-baking method is carried out by applying a base coating containing a resin having hydroxyl group or both hydroxyl group and carboxyl group in the molecule and if required, a catalyst as vehicle components, coats formed are remarkably improved in water resistance, adherence between the base coat and topcoat and resistance to cohesive failure in which the two-coatings-one-baking method is defective, while remaining outstanding, far from reduction, in surface smoothness, distinctness-of-image gloss and weathering resistance in which the method excels. The foregoing remarkable result can be afforded presumably due to the following phenomena. When a topcoating is applied to the base coat and cured at ambient temperature to about 140° C., there occurs not only in the topcoat but also in the base coat a cross-linking reaction between the hydroxyl group-containing resin and the polyisocyanate compound in the topcoat to produce three-dimensionally cured coatings. Namely the polyisocyanate compound in the topcoat, while partly reacting with the hydroxyl group of the resin in the topcoat, partly penetrates into the base coat to react with the hydroxyl group of the resin in the base coat for cross-linking at the interface between the base coat and the topcoat and in the base coat. According to this invention, the resin is three-dimensionally cured by cross-linking at the base coat-topcoat interface and even in the base coat as well as in the topcoat, thereby resulting in a finish coat markedly improved in water resistance and in the adherence between the base coat and topcoat and free from cohesive failure. What is important to achieve these remarkable results is that the reaction be critically promoted between the hydroxyl group of the resin in the base coat and the isocyanate group of the polyisocyanate compound in the topcoat. For this purpose, the resins used in the base coating are those containing hydroxyl group or hydroxyl and carboxyl groups in the molecule, and the hydroxyl group-containing resin is necessarily used in combination with a catalyst for accelerating the reaction of the hydroxyl group with the polyisocyanate compound while the hydroxyl- and carboxyl-containing resin can be employed alone or in combination with the above catalyst, if desired, since the carboxyl group in the resin molecule serves to accelerate the foregoing reaction.

The base coating of this invention which is applied prior to the application of topcoating comprises water or an organic solvent as a dispersing medium, a coloring pigment and/or metallic pigment and the following vehicle components.

(a) a resin containing hydroxyl group and carboxyl group in the molecule, (b) a resin containing hydroxyl group in the molecule and a catalyst, or (c) the resin mentioned in (a) and a catalyst.

Examples of resins having the basic structure of those mentioned above in (a) to (c) are acrylic resins: polyester resins; modified acrylic resins such as chlorinated polyolefin-modified acrylic resins, polycaprolactone-modified acrylic resins and urethane-modified acrylic resins: modified polyester resins such as polycaprolactone-modified polyester resins, urethane-modified polyester resins, etc. According to this invention, use is made of these resins having hydroxyl in the molecule and when required, carboxyl introduced therein.

The hydroxyl group-containing or hydroxyl group- and carboxyl group-containing acrylic resins useful in the invention can be prepared by copolymerizing an acrylic monomer with a hydroxyl group-containing vinyl monomer and if necessary a carboxyl group-containing vinyl monomer in the usual manner. The acrylic monomer may be further copolymerized with other vinyl monomers copolymerizable therewith. Preferred examples of acrylic monomers are alkyl ($C_{1-18}$) or alkoxyalkyl acrylate or methacrylate. Examples of hydroxyl group-containing monomers are hydroxyethyl acrylate, hydroxyethyl methacrylate, hydroxypropyl acrylate, hydroxypropyl methacrylate, and like $C_{2-5}$ hydroxyalkyl acrylate or methacrylate, adducts of glycidyl acrylate or glycidyl methacrylate with monocarboxylic acid ($C_{2-18}$), adducts of glycidyl monocarboxylate (e.g. "Cardura E," tradename, product of Shell Petroleum Chemical Co., Ltd., U.S.A.) with acrylic acid or methacrylic acid: N-methylolacrylamide, etc. Examples of carboxyl group-containing monomers are acrylic acid, methacrylic aicd, maleic aicd, fumaric acid, etc. Examples of vinyl monomers copolymerizable with the acrylic monomer are styrene, α-methylstyrene, vinyltoluene, vinylpyridine, glycidyl acrylate, glycidyl methacrylate, allylglycidyl ether, acrylamide, N-butoxymethyl acrylamide, acrylonitrile, etc.

Polyester resins are produced by reacting a polybasic acid with a polyhydric alcohol. Examples of polybasic acids include acids having at least two carboxyl groups in the molecule and anhydrides thereof. Preferred examples are phthalic anhydride, tetrahydrophthalic anhydride, isophthalic acid, maleic anhydride, fumaric acid, trimellitic anhydride, methylene tricyclohexene tricarboxyl anhydride, pyromellitic anhydride, itaconic acid, adipic acid, sebacic acid, azelaic acid, hexahydrophthalic anhydride, 3,6-endomethylenetetrahydrophthalic anhydride, succinic anhydride, "Het Anhydride" (tradename, product of Hooker Chemical Corp.), etc.

Useful polyhydric alcohols are, for example, ethylene glycol, diethylene glycol, triethylene glycol, propylene glycol, neopentyl glycol, butylene glycol, hexanediol, trimethylolethane, trimethylolpropane, pentaerythritol, dipentaerythritol, sorbitol, etc. Polyester resins may be any of those modified with monobasic acids, fatty acids, oil ingredients or the like. The hydroxyl group can be easily introduced into the polyester resin using a polyhydric alcohol with at least three hydroxyl groups in the molecule, and the carboxyl group can be readily introduced thereinto using a polybasic acid with at least three carboxyl groups in the molecule or a half esterification reaction of dibasic acid.

The hydroxyl group-containing or hydroxyl group- and carboxyl group-containing chlorinated polyolefin-modified acrylic resin useful in the invention can be prepared by graft polymerization of chlorinated polyolefin with acrylic monomer, hydroxyl group-containing monomer and, when required, carboxyl group-containing monomer. Useful acrylic monomers, hydroxyl group-containing monomers and carboxyl group-containing monomers are those exemplified above. Usable as chlorinated polyolefins are polyolefins chlorinated at a rate of about 50% or less, preferably about 10 to about 45%, more preferably about 20 to about 40%. Examples of polyolefins to be chlorinated are those prepared by homopolymerizing or copolymerizing olefins such as ethylene, propylene, 1-butane, 3-methyl-1-butene, 3-methyl-1-heptene and the like, or copolymerizing the olefin with vinyl acetate, butadiene, acrylate, methacrylate or like vinyl monomers. These polyolefins are chlorinated by conventional methods. Examples of suitable chlorinated polyolefins are chlorinated polyethylene, chlorinated polypropylene, chlorinated ethylene-propylene copolymer, chlorinated ethylene-vinyl acetate copolymer, etc. In the graft polymerization of chlorinated polyolefin with acrylic monomer, hydroxyl group-containing monomer, and when required carboxyl group-containing monomer, other vinyl monomers can be used. The amount of the whole monomers to be grafted with the chlorinated polyolefin is about 10 to about 90% by weight, preferably about 30 to about 80%, based on the combined amount of the monomers and the chlorinated polyolefin.

Illustrative of useful hydroxyl group-containing or hydroxyl group- and carboxyl group-containing caprolactone-modified acrylic resins are resins prepared by polymerizing an addition product of ε-caprolactone and 2-hydroxyethyl methacrylate or like hydroxyl group-containing acrylic monomer and if required, carboxyl group-containing monomer, acrylic monomer and other vinyl monomer can be copolymerized.

Examples of useful hydroxyl group-containing or hydroxyl group- and carboxyl group-containing urethane-modified acrylic resins are those prepared by copolymerizing hydroxyl group-containing acrylic monomer and an addition product of 2-hydroxymethyl methacrylate and like hydroxyl group-containing acrylic monomer and isophorone diisocyanate and like diisocyanate compound modified by reacting one of isocyanate groups with a monohydric alcohol. If necessary, acrylic monomer, carboxyl group-containing monomer and other vinyl monomer can be copolymerized. The urethane-modified acrylic resins also include those having an urethane bond formed by reacting the foregoing hydroxyl group-containing or hydroxyl group- and carboxyl group-containing acrylic resin with a polyisocyanate compound, e.g. hexamethylene diisocyanate and monoisocyanate compound, e.g. butyl isocyanate.

Examples of useful hydroxyl group-containing or hydroxyl group- and carboxyl group-containing caprolactone-modified polyester resins are those, for example, prepared by reacting the foregoing hydroxyl group-containing or hydroxyl group- and carboxyl group-containing polyester resin with ε-caprolactone in the presence of a suitable catalyst.

Examples of useful hydroxyl group-containing or hydroxyl group- and carboxyl group-containing urethane-modified polyester resins are those having an urethane bond formed by reacting hexamethylene diisocyanate or like polyisocyanate compound with the foregoing hydroxyl group-containing or hydroxyl group- and carboxyl group-containing polyester resin having a relatively low molecular weight.

Preferred hydroxyl group-containing or hydroxyl group- and carboxyl group-containing resins for the base coating are acrylic resins, chlorinated polyolefin-modified acrylic resins, polyester resins and the like having the groups among which chlorinated polyolefin-modified acrylic resins are more preferred because they are high in adhesion with polyolefin and like non-polar plastics.

The hydroxyl group content in the hydroxyl group-containing or hydroxyl group- and carboxyl group-containing resin to be used in the invention can be varied in a wide range and is usually in terms of a hydroxyl value of about 5 to about 200. Preferred resins have a hydroxyl value of about 10 to about 120, more preferably about 15 to about 100. The carboxyl group content in the resin having carboxyl as well as hydroxyl in the molecule is in terms of an acid value in the range of preferably about 2 to about 30, more preferably about 5 to about 15, for the organic coating composition, and an acid value of preferably about 1 to about 200, more preferably about 15 to about 100, for the aqueous coating composition. These resins have a number-average molecular weight of about 5,000 to about 100,000, preferably about 8,000 to about 60,000 in the base coating of the organic composition and a number-average molecular weight of about 5,000 to about 2,000,000, preferably about 10,000 to about 1,000,000 in the aqueous coating composition.

Of the resins exemplified above, those lacking carboxyl group but containing hydroxyl group in the molecule must be conjointly used with a catalyst to increase the reactivity of the hydroxyl group with the isocyanate group. On the other hand, the resin having hydroxyl group and carboxyl group in the molecule is reactive with the isocyanate group and thus is not necessarily combined with a catalyst. Nevertheless, it is desirable to use such resin in combination with a catalyst to improve the reactivity of the hydroxyl group with the isocyanate group. The catalysts to be used are those conventional in the art for accelerating the reaction of hydroxyl group and isocyanate group. Examples thereof are tertiary amines such as triethylamine, triethylenediamine, hexamethylenetetramine, methylmorpholine, N-ethylmorpholine, N-methylpiperazine, N,N'-dimethylpiperazine, N,N'-dimethylbenzylamine, N,N'-dimethyldodecylamine, N,N,N',N'-tetramethylethylenediamine, N,N,N',N'-tetramethylhexamethylenediamine, N,N,N',N'-tetramethyl-1,3-diaminobutane, etc.: acids such as phosphoric acid, p-toluenesulfonic acid, etc.; metal salts of fatty acids such as potassium oleate, tin octenoate, lead 2-ethylhexoate, iron 2-ethylhexoate, cobalt 2-ethylhexoate, titanium 2-ethylhexoate, etc.: metal salts of alicylic acids such as zinc naphthenate, manganese naphthenate, copper naphthenate, lead naphthenate, nickel naphthenate, cobalt naphthenate, etc.; organic tin compounds such as tri-n-butyl tin chloride, tetra-n-butyl tin, di-n-butyl tin dioctenoate, di-n-butyl tin dilaurate, di-n-butyl tin diacetate, dibutyl tin oxide, dioctyl tin oxide, dibutyl tin di(2-ethylhexoate), etc.: organic phosphates such as dimethyl phosphate, di-n-butyl phosphate, etc.: salts of 1,8-diazabicyclo(5,4,0)undecane such as phenol, octylic acid or oleic acid salt of 1,8-diazabicyclo(5,4,0) undecane, etc.: other inorganic catalysts such as antimony trichloride, bismuth nitrate, tin chloride, iron chloride, phenylsodium, tetra(2-ethylhexyl)titanate, etc. These catalysts are usable singly or at least two of them can be used in admixture. Of the examples, preferred catalysts are dibutyl tin di(2-ethylhexoate), tin octenoate, di-n-butyl tin dilaurate, tri-n-butyl chlorotin, tetra-n-butyl tin, di-n-butyl tin diacetate, etc.

The base coating of this invention is an organic or aqueous coating composition comprising the resin and when required, catalyst as disclosed above, dissolved or dispersed in an organic solvent and/or water together with a coloring pigment and/or metallic pigment. An extender pigment may be incorporated in the base coating when required. Useful organic solvents include those known and capable of dissolving or dispersing the resin. Examples of suitable organic solvents are toluene, xylene, hexane, heptane and like hydrocarbons: butanol, hexanol, cyclohexanol, benzyl alcohol and like alcohols methyl ethyl ketone, methyl isobutyl ketone, cyclohexanone, isophorone and like ketones: dioxane, ethylene glycol monomethyl ether, diethylene glycol monomethyl ether and like ethers: ethyl acetate, ethylene glycol acetate monomethyl ether, diethylene glycol acetate monoethyl ether and like esters; etc. According to the invention, the aqueous dispersion or aqueous solution of the resin can be obtained by emulsifying or dissolving the resin in aqueous medium in the presence of an emulsifier, if necessary, or by producing the resin by emulsion polymerization. The hydroxyl group- and carboxyl group-containing resin may be made water-soluble or water-dispersible by partly or completely neutralizing the carboxyl group(s), prior to dissolution or dispersion in aqueous medium. Examples of basic compounds usesful for neutralization of the carboxyl group are alkanolamines such as monoethanolamine, diethanolamine and dimethylaminoethanol: alkylamines such as diethylamine and triethylamine inorganic alkalis such as potassium hydroxide and sodium hydroxide: etc. among which tertiary amines can be also used as a catalytic hardener, hence preferably usable. The aqueous coating composition may contain water-soluble organic solvents.

Useful coloring pigments and metallic pigments are not specifically limited and can be any of those known in the art. The amounts of the coloring pigment and metallic pigment for the base coating are not specifically limited and can be determined according to a particular purpose. The amount of the catalyst to be used for the base coating is about 0.01 to about 10 parts by weight, preferably about 0.05 to about 5 parts by weight, per 100 parts by weight of the resin solids. Preferred base coatings according to this invention contain as vehicle components the combination of a hydroxyl group-containing resin and a catalyst or the combination of a hydroxyl group- and carboxyl group-containing resin and a catalyst.

The topcoating to be applied to the surface of the base coat contains a hydroxyl group-containing resin and polyisocyanate compound as vehicle components, and is a coating composition of the organic liquid type giving a clear coat which makes visible the color of the base coat and the metallic effect thereof.

Of the resins exemplified above for the base coating, those containing hydroxyl group are usable as the resin for the topcoating. The hydroxyl group-containing resin for the topcoating has a number-average molecular weight ranging from about 3,000 to about 50,000, preferably about 8,000 to about 40,000. The hydroxyl group content in the resin is commensurate with a hydroxyl value of about 30 to about 150, preferably about 50 to about 120.

The polyisocyanate compounds which can be used for the topcoating are those having at least two free isocyanate groups in the molecule. Representative examples of such compounds are tolylene diisocyanate, 4,4'-diphenylmethane diisocyanate, xylene diisocyanate, m-xylene diisocyanate, hexamethylene diisocyanate, lysine diisocyanate, hydrogenated 4,4'-diphenylmethane diisocyanate, hydrogenated tolylene diisocyanate, isophorone diisocyanate, trimethylhexamethylene diisocyanate, dimer acid diisocyanate, adduct of tolylene diisocyanate (3 moles) with trimethylolpropane (1 mole), tolylene diisocyanate polymer, adduct of hexamethylene diisocyanate (3 moles) with trimethylolpropane (1 mole), reaction product of hexamethylene diisocyanate and water, adduct of xylene diisocyanate (3 moles) with trimethylolpropane (1 mole), adduct of tolylene diisocyanate (3 moles) with hexamethylene diisocyanate (2 moles), etc. These polyisocyanate compounds can be used singly or at least two of them are usable in admixture. Of the examples enumerated above, those having a high weather resistance and unlikely to become yellow are preferred, such as a reaction product of hexamethylene diisocyanate and water, adduct of xylene diisocyanate with trimethylolpropane, adduct of tolylene diisocyanate with hexamethylene diisocyanate, isophorone diisocyanate, hexamethylene diisocyanate, lysine diisocyanate, etc.

The ratio of the hydroxyl group-containing resin to the polyisocyanate compound in the topcoating ranges from about 0.5 to about 2.5, preferably about 0.7 to about 2.0, calculated as hydroxyl group/isocyanate group ratio by mole. Since the two components tend to react at room temperature, curing by cross-linking, they are preferably stored in separate form and mixed together before use. When required, the topcoating can further contain additives such as a coloring pigment, extender pigment, metallic pigment, surface-improving agent, catalyst for accelerating hardening, cissing inhibitor, ultraviolet absorbing agent, oxidation inhibitor, etc. The ratios of coloring pigment and metallic pigment are in such range that the transparency of the topcoat (see-through property of making visible the color of the base coat and the metallic effect thereof) is not impaired.

The base coat and topcoat of this invention applied are cured at a temperature of between ambient temperature and about 140° C. Thus it is most suitable to apply the coatings to articles of plastics which will deform or change their properties when heated to over 140°, such as those of polyethylene, polypropylene and like polyolefins, acrylonitrile-butadiene-styrene copolymer, polycarbonate, nylon, fiber reinforced plastics (e.g. sheet mold compound), polyurethane resins, polyphenyleneoxide (e.g., "NORYL," tradename), etc. In application to metallic substrates in place of conventional thermosetting coating compositions curable at a temperature higher than 140° C., the base coating and topcoating of the invention need not be heated to over 140° C., resulting in saving of energy. The base coating and topcoating of the invention can be applied also to articles of wood, glass, inorganic materials or the like.

The base coating of the invention can be applied directly to the substrates exemplified above. Nevertheless, it is preferred to apply the base coating over a plastics article subjected to vapor degreasing with trichloroethane or to degreasing with toluene or a metallic article surface-treated with phosphate or the like and coated with an electrophoretic coating composition to form a primer coat and/or intercoat.

The methods for applying the base coating of the invention are not specifically limited and include various conventional methods such as brushing, immersion methods, spraying, electrostatic coating, roll coating, anionic electrophoretic coating, etc. For use in spraying, the base coating is preferably adjusted to a viscosity of about 10 to about 20 seconds (Ford cup No.4/20° C.). The thickness of the dried base coat is in the range of about 10 to about 25μ, preferably about 15 to about 20μ.

The methods for applying the topcoating of the invention are not also specifically limited and include a wide variety of those as is the case with the application of the base coating. However, the topcoating to be sprayed is preferably adjusted to a viscosity of about 10 to about 30 seconds (Ford cup No.4/20° C.). Adequate thickness of the dried topcoat ranges from about 25 to about 50μ, preferably about 30 to about 40μ.

The topcoating is applied preferably to the base coat dried to a tack-free state (drying time according to JIS K 5400-1979, 5.8). For example, it is suitable that the topcoating be applied to the base coat left to stand at room temperature for about 1 minute or more, preferably about 3 to about 20 minutes.

When the topcoating is applied to an aqueous base coat to produce a topcoat of the above-specified thickness, there is substantialy unlikely to occur a reaction between the water in the base coat and the polyisocyanate compound in the topcoat. While the topcoating is consequently applicable to the base coat at the desired time after application of the aqueous base coating, it is appropriate that the topcoating be applied after setting of the base coat for about one minute or more, preferably about 3 to about 30 minutes at room temperature, or for about 30 seconds or more, preferably about 2 to about 5 minutes at about 50 to about 120° C.

The base coating and topcoating of the invention are applied in this way and cured at a temperature of between room temperature and about 140° C. Preferred temperature range is between room temperature and about 120° C., more preferably between room temperature and about 100° C. During setting of the coats, there arise cross-linking reactions, within the topcoat between the hydroxyl group-containing resin and the polyisocyanate compound on one hand and simultaneously at the base coat-topcoat interface and within the base coat between the hydroxyl group of the resin in the base coat and the isocyanate group of the polyisocyanate compound penetrated from the topcoat into the base coat on the other hand. In other words, the coats are formed in this manner by low-temperature curing in two-coatings-one-baking method, resulting in considerable improvements in water resistance, adherence between the base coat and topcoat, cohesive failure resistance and like properties.

This invention will be described below in more detail with reference to the following Examples and Comparison Examples in which the parts and the percentages are all by weight.

EXAMPLES 1 TO 8 AND COMPARISON EXAMPLES 1 TO 3

I. Test piece (1) Substrate (i) Test piece of polypropylene (7.5 cm×15 cm×0.2 cm) subjected to vapor degreasing with trichloroethane.

(ii) Test piece stated above in (i) and coated with "Soflex No. 2000 Primer" (tradename, product of Kansai Paint Co., Ltd., Japan, primer for polypropylene substrate).

(iii) Steel plate surface-treated with "Bonderite No. 3030" (tradename, product of Nippon Parker Rising Co., Ltd., Japan, zinc phosphate type), measuring 7.5 cm×15 cm×0.2 cm and coated with "Elecron No. 9200" (tradename, product of Kansai Paint Co., Ltd., Japan, cationic electrophoretic coating composition of the epoxy type) and "Amilac N-2 Sealer" (tradename, product of Kansai Paint Co., Ltd., Japan, coating composition of the aminopolyester resin type for intercoat).

(2) Base coating (B-1)

A base coating (B-1) was prepared by mixing 100 parts of a hydroxyl group- and carboxyl group-containing graft copolymer (32,000 in number-average molecular weight, 20 in hydroxyl value and 7 in acid value, produced by graft polymerization of polypropylene resin chlorinated at a ratio of 28% with methyl methacrylate, 2-ethylhexyl acrylate, n-butyl acrylate, acrylic acid and hydroxyethyl acrylate) with 12 parts of "Aluminum Paste 55-516" (tradename, product of Toyo Aluminum Kabushiki Kaisha, Japan) and dissolving the composition thus obtained in a 1:1 weight ratio mixture of toluene and xylene to adjust the viscosity to 15 seconds (Ford cup No.4/20° C.).

(B-2)

A base coating (B-2) was prepared in the same manner as in (B-1) with the exception of further adding 0.1 part of di-n-butyl tin dilaurate as a catalyst per 100 parts of the graft copolymer.

(B-3)

A base coating (B-3) was prepared in the same manner as in (B-2) with the exception of using the same graft copolymer as used in (B-1) and having an acid value of 13.

(B-4)

A base coating (B-4) was prepared in the same manner as in (B-2) with the exception of using 0.3 part of dibutyl tin di-(2-ethylhexoate) as a catalyst in place of 0.1 part of di-n-butyl tin dilaurate.

(B-5)

A base coating (B-5) was prepared in the same manner as in (B-2) with the exception of using 0.5 part of tri-n-butyl tin chloride as a catalyst in place of 0.1 part of di-n-butyl tin dilaurate.

(B-6)

A base coating (B-6) was prepared in the same manner as in (B-2) with the exception of using 0.8 part of tetra-n-butyl tin as a catalyst in place of 0.1 part of di-n-butyl tin dilaurate.

(B-7)

A base coating (B-7) was prepared by mixing 100 parts of a hydroxyl group-containing acrylic resin (produced by copolymerizing methyl methacrylate, hydroxyethyl methacrylate, n-butyl acrylate and ethyl acrylate and having a number-average molecular weight of 28,000, hydroxyl value of 25 and acid value of 0) with 0.2 part of tin octenoate and 12 parts of "Aluminum Paste 55-516," and dissolving the composition thus obtained in the same organic solvent as used above in (B-1) to adjust the viscosity to 15 seconds (Ford cup No.4/20° C.).

(B-8)

A base coating (B-8) was prepared by 100 parts of hydroxyl group- and carboxyl group-containing polyester resin (produced by condensing trimethylolpropane, neopentyl glycol, phthalic anhydride, isophthalic acid, hexahydrophthalic anhydride and 1,6-hexanediol and having a number-average molecualr weight of 25,000, hydroxy value of 32 and acid value of 10) with 0.1 part of tin octenoate and 12 parts of "Aluminum Paste 55-516" and dissolving the composition thus obtained in the same solvent as used in (B-1) to adjust the viscosity to 15 seconds (Ford cup No.4/20° C.).

(B-9)

A base coating (B-9) was prepared by mixing 100 parts of acrylic resin (produced by copolymerizing methyl methacrylate, n-butyl acrylate and ethyl acrylate and having a number-average molecular weight of 28,000 and containing no hydroxyl group nor carboxyl group) with 0.2 part of tin octenoate and 12 parts of "Aluminum Paste 55-516" and dissolving the composition thus obtained in the same solvent as used in (B-1) to adjust the viscosity to 15 seconds (Ford cup No.4/20° C.).

(B-10)

A base coating (B-10) was prepared by mixing 100 parts of a hydroxyl group-containing graft copolymer (produced by graft copolymerization of chlorinated polypropylene resin having a chlorination of 28% with methyl methacrylate, 2-methylhexyl acrylate, n-butyl acrylate and hydroxyethyl acrylate and having a number-average molecular weight of 32,000, hydroxyl value of 20 and acid value of 0) with 12 parts by weight of "Aluminum Paste 55-516" and dissolving the composition thus obtained in the same solvent as used above in (B-1) to adjust the viscosity to 15 seconds (Ford cup No.4/20° C.).

(B-11)

A base coating (B-11) was prepared in the same manner as in (B-1) with the exception of using a hydroxyl group-containing acrylic resin (produced by copolymerizing methyl methacrylate, hydroxyethyl methacrylate, n-butyl acrylate and ethyl acrylate and having a number-average molecular weight of 28,000, hydroxyl value of 25 and acid value of 0).

The base coatings (B-1) to (B-8) are for the present invention and the base coatings (B-9) to (B-11) are for Comparison Examples.

(3) Topcoating

A topcoating (T) was prepared by mixing together a hydroxyl group-containing acrylic resin (produced by copolymerizing styrene, hydroxyethyl acrylate, n-butyl acrylate, 2-ethylhexyl acrylate and butyl methacrylate and having a hydroxyl value of 95 and a number-average molecular weight of 10,000) and "Duranate 24 A" (tradename) in an OH/NCO mole ratio of 1:1 and dissolving the composition thus obtained in a 1:4 weight ratio mixture of toluene and xylene to adjust the viscosity to 18 seconds (Ford cup No.4/20° C.). II. Coating method Each of the base coatings and topcoatings was applied by a spray to each of the substrates under the conditions as shown below in Table 1.

III. Results of performance tests

The test pieces with coats formed as above were tested for properties. Table 2 below shows the results.

TABLE 2

|  | Example | | | | | | | | Comp. Example | | |
|---|---|---|---|---|---|---|---|---|---|---|---|
|  | 1 | 2 | 3 | 4 | 5 | 6 | 7 | 8 | 1 | 2 | 3 |
| Water resistance (*1) | A | A | A | A | A | A | A | A | C | C | D |
| Adhesion between coats (*2) | C | A | A | A | A | A | A | A | D | D | D |
| Cohesive failure (*3) | C | A | A | A | A | A | A | A | D | D | D |
| Metallic appearance (*4) | A | A | A | A | A | A | A | A | A | A | A |
| Smoothness of coating surface (*5) | A | A | A | A | A | A | A | A | A | A | A |
| Gloss (*6) | 95 | 95 | 95 | 95 | 95 | 95 | 95 | 95 | 95 | 95 | 95 |
| Pot life of base coat (*7) | ∞ | ∞ | ∞ | ∞ | ∞ | ∞ | ∞ | ∞ | ∞ | ∞ | ∞ |

TABLE 1

|  | Base coat | | | | Topcoat | | |
|---|---|---|---|---|---|---|---|
|  | Substrate | Base coating | Thickness (μ) | Setting conditions | Topcoating | Thickness (μ) | Curing conditions |
| Ex. | | | | | | | |
| 1 | (i) | (B-1) | 15–20 | Room temp., 3 min | (T) | 35–40 | Standing at room temp., 5 min & heated to 80° C., 30 min |
| 2 | (i) | (B-2) | " | " | " | " | Standing at room temp., 5 min & heated to 80° C., 30 min |
| 3 | (i) | (B-3) | " | " | " | " | Standing at room temp., 5 min & heated to 80° C., 30 min |
| 4 | (i) | (B-4) | " | " | " | " | Standing at room temp., 5 min & heated to 80° C., 30 min |
| 5 | (i) | (B-5) | " | " | " | " | Standing at room temp., 5 min & heated to 80° C., 30 min |
| 6 | (i) | (B-6) | " | " | " | " | Standing at room temp., 5 min & heated to 80° C., 30 min |
| 7 | (ii) | (B-7) | " | " | " | " | Standing at room temp., 5 min & heated to 80° C., 30 min |
| 8 | (iii) | (B-8) | " | " | " | " | Standing at room temp., 5 min & heated to 80° C., 30 min |
| Comp. Ex. | | | | | | | |
| 1 | (i) | (B-9) | " | " | " | " | Standing at room temp., 5 min & heated to 80° C., 30 min |
| 2 | (ii) | (B-10) | " | " | " | " | Standing at room temp., 5 min & heated to 80° C., 30 min |
| 3 | (ii) | (B-11) | " | " | " | " | Standing at room temp., 5 min & heated to 80° C., 30 min |

Note:
(1) The coat thickness (μ) is based on the dried coat.

The performance tests were conducted by the following methods.

(*1) Water resistance

The test piece was immersed in water at 40° C. for 240 hours and then the appearance of the coating surface was observed with the unaided eyes and evaluated according to the rating as described below.

A: The test piece was free from any change.
B: The test piece had a few blisters
C: The test piece had blisters interspersed.
D: The test piece abounded in blisters.

(*2) Adhesion between coats

The test piece was cut crosswise at and near its center to the substrate surface with a cutter knife to form 100 squares, 1 mm×1 mm. An adhesive celophane tapes were adhered to the coating surface of each test piece and peeled off by a strong pull to evaluate the appearance of the squares by the following rating.

A: No peel was found.
B: The topcoat was peeled off the base coat in a slight degree.
C: The topcoat was peeled off the base coat here and there.
D: The topcoat was peeled off the base coat in a marked degree.

(*3) Cohesive failure

The same procedure as in (*2) was repeated to check the squares in the base coat and topcoat for cohesive failure. The result was evaluated by the following rating.

(A) No cohesive failure was seen.
(B) The base coat and topcoat were scarcely broken
(C) The base coat and topcoat were broken here and there.
(D) The base coat and/or topcoat suffered a highest degree of cohesive failure.

(*4) Metallic appearance

The test piece was observed with the unaided eye to check the metallic appearance, rating the result by the following criterion.

(A) An significantly improved metallic appearance was seen.
(B) A slightly improved metallic appearance was seen.
(C) A little unevenness in metallic effect was found.
(D) A marked unevenness in metallic effect was found.

(*5) Surface smoothness

The test piece was observed with the unaided eye to check the smoothness of coating surface, rating the result by the following criterion.

(A) Excellent
(B) Good
(C) Fair
(D) Poor

(*6) Gloss

Reflectance determined with incident light falling at an angle of 60° on a mirror.

(*7) Pot life of base coat

The base coatings (B-1) to (B-11) were stored in a closed space at 20° C. to count the time (hr.) taken for the viscosity to increase to 20 seconds (from the original viscosity of 15 seconds in terms of Ford cup No.4/20° C.).

EXAMPLES 9 TO 15 AND COMPARISON EXAMPLES 4 AND 5

I. Test piece (1) Substrate

The substrates (i) and (iii) as specified hereinbefore were used.

(2) Aqueous composition of resin for base coat (i) Aqueous solution of acrylic resin (W-1)

An aqueous solution of acrylic resin in a concentration of 70% having a number-average molecular weight of about 10,000, a hydroxyl value of 72 and an acid value of 39 was obtained by copolymerizing 15 parts of styrene, 20 parts of methyl methacrylate, 25 parts of ethyl acrylate, 20 parts of butyl acrylate, 15 parts of hydroxyethyl acrylate and 5 parts of acrylic acid in butyl cellosolve using $\alpha,\alpha'$-azobisisobutyronitrile as a polymerization initiator. To 100 parts of the solution were added 4.3 parts of dimethylaminoethnol and then water to give an aqueous solution of water-soluble acrylic resin having a concentration of 55% (W-1).

(ii) Aqueous dispersions of acrylic resins (W-2) and (W-3)

In a reactor were placed 68.0 parts of deionized water, 0.2 part of ammoium persulfate and 1.5 parts of "Triton X-200" (tradename, anionic surfactant produced by Rohm & Haas, Co., Ltd.). The solution was heated to 95° C. The aqueous emulsion comprising the acrylic monomers and other components as listed below in Table 3 was added dropwise to the solution heated and maintained at 95° C. over a period of 3 hours. After addition of the emulsion, the reaction mixture was retained at 95° C. with stirring for about 2 hours and cooled to 35° C. by standing. Thereto were added 0.5 part of dimethylethanolamine and 4 parts of deionized water, giving a stable, opaque white dispersion of water-dispersible acrylic resin in a solid concentration of 45% (W-2) having a number-average molecular weight of about 13,000. The same procedure was repeated to give another dispersion (W-3) of acrylic resin having a number-average molecular weight of about 15,000 using the aqueous emulsion of acrylic resin monomers shown below in Table 3.

TABLE 3

| | W-2 | W-3 |
|---|---|---|
| Styrene | 15 | 15 |
| Methyl methacrylate | 35 | 25 |
| Ethyl acrylate | 33 | — |
| n-Butyl acrylate | — | 45 |
| 2-Hydroxypropyl methacrylate | 15 | 15 |
| Acrylic acid | 2 | — |
| n-Octyl mercaptan | 0.6 | 0.6 |
| Ammonium persulfate | 0.4 | 0.4 |
| Triton X-200* | | |
| Emmulgen 840S** | 1.0 | 1.5 |
| Deionized water | 53 | 50 |
| Hydroxyl value of acrylic resin | 58 | 58 |
| Acid value of acrylic resin | 15 | 0 |

Note:
The unit of the amount is part by weight.
*as defined above.
**Trademark, nonionic surfactant produced by Kao Atlas Co., Ltd., Japan.

(iii) Aqueous dispersion of chlorinated polyolefin-modified acrylic resin (W-4)

A graft copolymer of chlorinated polypropylene with acrylic monomers (32,000 in number-average molecular weight, 20 in hydroxyl value and 50 in acid value) was neutralized with triethylamine and dispersed in water, giving an aqueous dispersion of resin in a solid concentration of 50%.

(3) Base coating (i) Aqueous metallic coating composition (M-1)

| | |
|---|---|
| Aqueous solution of acrylic resin (W-1) | 100 parts |
| Aqueous dispersion of acrylic resin (W-2) | 45 parts |

The above-specified components were mixed together and adjusted to a viscosity of 16 seconds (Ford cup No.4/20° C.) with a mixture of water and an dispersion of aluminum paste comprising:

| | |
|---|---|
| Aluminum Paste A | 10 parts |
| (trademane "Aluminum Paste No. 4919," product of Toyo Aluminum Kabushiki Kaisha, Japan) | |
| Aluminum Paste B | 20 parts |
| (tradename "Aluminum Paste No. 55-519," product of Toyo Aluminum Kabushiki Kaisha, Japan) | |
| Isopropyl alcohol | 30 parts |

(ii) Aqueous metallic coating composition (M-2)

| | |
|---|---|
| Aqueous dispersion of acrylic resin (W-3) | 100 parts |
| Aluminum Paste A (as above) | 5 parts |
| Aluminum Paste B (as above) | 10 parts |
| 10% solution of dibutyl tin diacetate in butyl cellosolve | 1.5 parts |
| Butyl cellosolve | 25 parts |

The above-specified components were mixed together and adjusted to a viscosity of 16 seconds (Ford cup No.4/20° C.) with water.

(iii) Aqueous metallic coatng composition (M-3)

| | |
|---|---|
| Aqueous solution of acrylic resin (W-1) | 100 parts |
| Aqueous dispersion of acrylic resin (W-2) | 45 parts |
| Aluminum Paste A (as above) | 10 parts |
| Aluminum Paste B (as above) | 20 parts |
| Isopropyl alcohol | 30 parts |
| 10% solution of dibutyl tin diacetate | 2 parts |
| in isopropyl alcohol | |

The above-specified components were mixed together and adjusted to a viscosity of 16 seconds (Ford cup No. 4/20° ) with water.

(iv) Aqueous metallic coating composition (M-4)

There were mixed together 200 parts of the aqueous dispersion of chlorinated polyolefin-modified acrylic resin (W-4), 0.1 part of di-n-butyl tin dilaurate and 20 parts of Aluminum Paste A as above. The mixture was adjusted to a viscosity of 16 seconds (Ford cup No.4/20° C.) with water.

(v) Aqueous metallic coating composition (M-5)

A coating composition having the same formulation as the aqueous metallic coating composition (M-2) with the exception of not using 1.5 parts of 10% solution of dibutyl tin diacetate.

(4) Topcoating (i) Topcoating (T-1)

There were polymerized 25 parts of methyl acrylate, 25 parts of ethyl acrylate, 36.5 parts of n-butyl acrylate, 12 parts of 2-hydroxyethyl acrylate and 1.5 parts of acrylic acid in xylene using as a polymerization initiator $\alpha,\alpha'$-azobisisobutyronitrile, giving a solution of acrylic resin in a solid concentration of 60%, the resin havig a number-average molecular weight of about 8,000, a hydroxyl value of 58 and an acid value of 12.

The solution was mixed with "Duranate 24 A" (tradename, adduct of hexamethylene diisocyanate with water manufactured by Asahi Kasei Chemical Industry Co., Ltd., Japan) in an OH/NCO mole ratio of 1:1.1. The mixture was adjusted to a viscosity of 18 seconds (Ford cup No.4/20° C.) with a 2:1 weight ratio mixture of toluene and xylene, giving a topcoating (T-1).

(ii) Topcoating (T-2)

A topcoating (T-2) was prepared in the same manner as in preparation of the topcoating (T-1) with the exception of changing the amount (36.5 parts) of n-butyl acrylate to 38 parts and not using 1.5 parts of acrylic acid.

II. Coating Method

Each substrate was coated with each base coating and topcoating as listed below in Table 4 in which the thickness of the coat was based on the dried coat.

TABLE 4

| | | Base coat | | | Topcoat | | |
|---|---|---|---|---|---|---|---|
| | Substrate | Base coating | Thickness | Setting | Topcoating | Thickness | Curing |
| Ex. | | | | | | | |
| 9 | (iii) | (M-1) | 15-20 | 80° C., 3 min | (T-1) | 35-40 | 80° C., 30 min |
| 10 | (iii) | (M-2) | " | " | " | " | " |
| 11 | (iii) | (M-3) | " | " | " | " | " |
| 12 | (iii) | (M-3) | " | 20° C., 7 min | " | " | " |
| 13 | (iii) | (M-3) | " | " | (T-2) | " | " |
| 14 | (i) | (M-4) | " | " | " | " | " |
| 15 | (i) | (M-4) | " | " | (T-1) | " | " |
| Comp. Ex. | | | | | | | |
| 1 | (iii) | (M-5) | " | 80° C., 3 min | (T-1) | " | " |
| 2 | (iii) | (T-1) | " | " | (T-2) | " | " |

Note:
The coat thickness ($\mu$) is based on the dried coat.

III. Results of performance tests

Table 5 below shows the results of the performance tests of the coats.

In Table 5, the gelation ratio of each coat was measured by the following method. The specimen (coat separated from the substrate) was immersed in a solvent (acetone/methanol weight ratio=1:1) and the solution was subjected to extraction at a boiling point for 3 hours. The gelation ratio (%) was given by the equation:

$$\frac{A-B}{A} \times 100$$

wherein A represents the weight of the specimen before extraction and B represents the weight of the specimen after extraction.

TABLE 5

|  | Example | | | | | | | Comp. Example | |
|---|---|---|---|---|---|---|---|---|---|
|  | 9 | 10 | 11 | 12 | 13 | 14 | 15 | 4 | 5 |
| Water resistance | A | A | A | A | A | A | A | D | C |
| Adhesion between coats | A | A | A | A | A | A | A | B | B |
| Cohesive failure | A | A | A | A | A | A | A | D | B |
| Metallic appearance | A | A | A | A | A | A | A | A | — |
| Surface smoothness | A | A | A | A | A | A | A | A | C |
| Gloss | 95 | 96 | 96 | 97 | 92 | 97 | 96 | 96 | 89 |
| Pot life of base coat | ∞ | ∞ | ∞ | ∞ | ∞ | ∞ | ∞ | ∞ | 3 |
| Gelation ratio | 90 | 91 | 95 | 90 | 87 | 88 | 92 | 60 | 96 |

We claim:

1. In a method for forming coatings on a substrate, comprising the steps of applying to the substrate a base coating consisting essentially of (i) a coloring pigment and/or a metallic pigment and (ii) a vehicle component in a solvent to produce a base coat, appying a topcoating containing a hydroxyl group-containing resin and a polyisocyanate compound over the base coat, and curing the coats at a temperature range between room temperature and about 140° C., the improvement wherein the vehicle component is selected from the group consisting of:

(a) a resin having a hydroxyl group and a carboxyl group in the molecule;

(b) a combination of a resin having a hydroxyl group in the molecule and a catalyst for promoting the reaction between the hydroxyl group of the resin and an isocyanate group of the polyisocyanate compound in the topcoating; and (c) a combination of a resin having a hydroxyl group and a carboxyl group in the molecule and a catalyst for promoting the reaction between the hydroxyl group of the resin and an isocyanate group of the polyisocyanate compound in the topcoating;

wherein the resin contained in the base coating has a number-average molecular weight of about 5,000 to about 100,000 when the solvent of the base coating is an organic solvent and a number-average molecular weight of about 5,000 to about 2,000,000 when the solvent of the base coating is an aqueous solvent.

2. A method according to claim 1 wherein the base coating is an organic solvent based composition.

3. A method according to claim 1 wherein the base coating is an aqueous solvent based composition.

4. A method according to claim 2 wherein said base coating comprises a resin having a hydroxyl group in the molecule or a resin having a hydroxyl group and a carboxyl group in the molecule, and a catalyst for accelerating the reaction between the hydroxyl group in the resin and the isocyanate group of the polyisocyanate compound in the topcoat.

5. A method according to claim 1 wherein the resin having hydroxy in the molecule or the resin having a hydroxyl group and a carboxyl group in the molecule is selected from the group consisting of acrylic resins, chlorinated polyolefin-modified acrylic resins and polyester resins, each having a hydroxyl group or a hydroxyl group and a carboxyl group in the molecule.

6. A method according to claim 1 wherein the hydroxyl group-containing resin or the hydroxyl group- and carboxyl group-containing resin has a hydroxyl value of about 5 to about 200.

7. A method according to claim 6 wherein said hydroxyl value is between about 10 and about 120.

8. A method according to claim 7 wherein the hydroxyl value of the resin is between 15 and 100.

9. A method according to claim 1 wherein the base coating is an organic solvent based composition and the resin having a hydroxyl group and a carboxyl group in the molecule has an acid value of about 2 to about 30.

10. A method according to claim 1 wherein the base coating is an aqueous composition and the hydroxyl group- and carboxyl group-containing resin has an acid value of about 1 to about 200.

11. A substrate coated by the method as defined in claim 1.

* * * * *